US012735106B2

(12) United States Patent
Richert et al.

(10) Patent No.: US 12,735,106 B2
(45) Date of Patent: Sep. 15, 2026

(54) MOTOR VEHICLE

(71) Applicant: Mercedes-Benz Group AG, Stuttgart (DE)

(72) Inventors: Julien Richert, Sindelfingen (DE); Ralf Bogenrieder, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 75 days.

(21) Appl. No.: 18/844,927

(22) PCT Filed: Mar. 7, 2023

(86) PCT No.: PCT/EP2023/055682

§ 371 (c)(1),
(2) Date: Sep. 6, 2024

(87) PCT Pub. No.: WO2023/170032

PCT Pub. Date: Sep. 14, 2023

(65) Prior Publication Data

US 2025/0187663 A1 Jun. 12, 2025

(30) Foreign Application Priority Data

Mar. 9, 2022 (DE) ..................... 10 2022 000 831.9

(51) Int. Cl.

| | |
|---|---|
| ***B62D 15/02*** | (2006.01) |
| ***B60R 21/015*** | (2006.01) |
| ***B60R 21/231*** | (2011.01) |
| ***B62D 6/00*** | (2006.01) |
| *B60R 21/00* | (2006.01) |
| *B60R 21/01* | (2006.01) |
| *B60R 21/0134* | (2006.01) |
| *B60R 21/0136* | (2006.01) |

(52) U.S. Cl.
CPC .... *B62D 15/0265* (2013.01); *B60R 21/01552* (2014.10); *B60R 21/23138* (2013.01);
(Continued)

(58) Field of Classification Search
CPC ............ B60R 21/0134; B60R 21/0136; B60R 21/01552; B60R 21/23138;
(Continued)

(56) References Cited

U.S. PATENT DOCUMENTS

| | | | |
|---|---|---|---|
| 10,577,008 B2 * | 3/2020 | Cazzoli | ............. B60R 21/01516 |
| 2006/0196715 A1 | 9/2006 | Fujishiro et al. | |
| 2016/0325783 A1 | 11/2016 | Richert | |

FOREIGN PATENT DOCUMENTS

| | | |
|---|---|---|
| CN | 105899408 A | 8/2016 |
| DE | 10 2007 035 751 A1 | 8/2009 |

(Continued)

OTHER PUBLICATIONS

Ishiwaka, JP H11-334636, machine translation. (Year: 1999).*
(Continued)

*Primary Examiner* — Mark L. Greene
(74) *Attorney, Agent, or Firm* — Crowell & Moring LLP

(57) ABSTRACT

A motor vehicle includes a vehicle wheel which is pivotable around a pivoting axis by a steering device such that cornering and/or changes of a direction of the motor vehicle is causable. An occupant protection device is triggerable in an event of an imminent collision or in an event of a detected collision and thus is movable from a starting position into a protection position such that a driver sitting on a seat system of the motor vehicle, or a body part of the driver, is movable. A coupling device couples the vehicle wheel to the occupant protection device where, via the coupling device, when the occupant protection device is triggered, a pivoting angle of the vehicle wheel around the pivoting axis caused by a steering intervention of the driver is influenceable.

5 Claims, 9 Drawing Sheets

(52) U.S. Cl.
CPC ...... *B62D 6/001* (2013.01); *B60R 2021/0004* (2013.01); *B60R 2021/0032* (2013.01); *B60R 2021/01252* (2013.01); *B60R 21/0134* (2013.01); *B60R 21/0136* (2013.01); *B60R 2021/23146* (2013.01)

(58) Field of Classification Search
CPC .... B60R 2021/0004; B60R 2021/0032; B60R 2021/01252; B60R 2021/23146; B62D 6/00; B62D 6/001; B62D 15/025; B62D 15/0265
See application file for complete search history.

(56) References Cited

FOREIGN PATENT DOCUMENTS

| | | | | |
|---|---|---|---|---|
| DE | 10 2010 052 416 | A1 | | 1/2012 |
| DE | 10 2013 021 139 | A1 | | 6/2015 |
| DE | 10 2014 000 266 | A1 | | 7/2015 |
| DE | 10 2014 018 707 | A1 | | 6/2016 |
| JP | H11334636 | A | * | 12/1999 |
| JP | 2003-182617 | A | | 7/2003 |
| JP | 2008-247329 | A | | 10/2008 |
| JP | 2013-226852 | A | | 11/2013 |
| WO | WO 2015/104044 | A1 | | 7/2015 |

OTHER PUBLICATIONS

International Search Report (PCT/ISA/210) issued in PCT Application No. PCT/EP2023/055682 dated Jun. 30, 2023 (2 pages).
German-language German Office Action issued in German Application No. 10 2022 000 831.9 dated Sep. 1, 2022 (5 pages).
German-language German Office Action issued in German Application No. 10 2022 000 831.9 dated Oct. 31, 2023 (5 pages).
German-language Written Opinion (PCT/ISA/237) issued in PCT Application No. PCT/EP2023/055682 dated Jun. 30, 2023 with English translation (7 pages).
Japanese-language Office Action issued in Japanese Application No. 2024-552138 dated Nov. 18, 2025 (3 pages).

* cited by examiner

MOTOR VEHICLE

BACKGROUND AND SUMMARY OF THE INVENTION

The invention relates to a motor vehicle.

DE 10 2014 018 707 A1 discloses a protection device for a car, having at least one airbag arranged in a seat system for the car, the airbag being able to be moved from a rest position into at least one protection position and being arranged, at least in the protection position, at least partially laterally next to a seat surface of a backrest of the seat system.

In addition, a method for operating a vehicle having at least one occupant protection means is known from DE 10 2014 000 266 A1, which is controlled in the event of a collision detected in front of the vehicle or in the event of a detected collision, wherein a vehicle occupant sitting on a vehicle seat or a part of the body of the vehicle occupant is moved by means of the triggered occupant protection means.

The object of the present invention is to create a motor vehicle, such that a level of safety of the car can be particularly increased.

The invention relates to a motor vehicle, which is preferably formed as a car, in particular as a passenger car, commercial vehicle or as a lorry.

The motor vehicle has at least one vehicle wheel, which can be tilted by means of a steering device with a steering intervention that is caused or can be caused by a driver of the motor vehicle around a pivoting angle around a pivot axis, whereby cornering and/or direction changes of the motor vehicle can be caused. This means that the tilting of the vehicle wheel can be caused by means of the steering intervention. In other words, the at least one vehicle wheel can be tilted around the pivoting axis, in particular in relation to a chassis of the motor vehicle and/or in relation to a structure of the motor vehicle, by in particular manually supplying the steering device with a torque that is caused or can be caused by the driver of the motor vehicle, whereby the cornering and/or the direction change of the motor vehicle can be caused.

The steering device can be referred to, in particular, as a steering handle, which is formed, for example, as a steering wheel. The steering handle is rotatably held, for example, on a holding device of the motor vehicle, wherein the steering handle can be rotated, in particular manually, around an axis of rotation, referred to, in particular as a steering axis of rotation, of the steering handle in relation to the holding device. The steering handle is coupled, in particular mechanically and/or electrically, to the at least one vehicle wheel in such a way, for example, that, as a result of the rotation of the steering handle around the axis of rotation, in particular by the driver, the pivoting of the vehicle wheel can be caused. This means that the pivoting of the vehicle wheel can be accompanied by the rotation of the steering handle. Preferably, the rotation of the steering handle can be caused by the torque applied to the steering handle, in particular by the driver.

The steering intervention can be understood, in particular, to mean a steering process of the motor vehicle caused by the driver of the motor vehicle. The steering intervention comprises, for example, applying the torque caused by the driver to the steering device and/or rotating the steering device.

The motor vehicle has at least one occupant protection device, which can be triggered in the event of an imminent collision or in the event of a detected collision and thus can be moved from a starting position into a protection position. The occupant protection device is preferably an air bag, referred to in particular as an airbag. The air bag can be understood, in particular, to mean a restraining device of the motor vehicle.

Preferably, the occupant protection device or the airbag is formed as a side airbag. Using the side airbag, the driver, for example, can be moved or pushed over a particularly large surface, whereby a maximum displacement or ability to displace, for example, can be increased.

The occupant protection device assumes the starting position, preferably in the completely produced state of the motor vehicle. The starting position can be understood, in particular, to mean a normal position of the occupant protection device. The protection device is different to the starting position. For example, a volume of the airbag in the starting position is smaller than in the protection position. In the starting position, the occupant protection device is not triggered.

The imminent collision can be understood, in particular, to mean a collision in front of the motor vehicle, which means that a looming collision, in particular an unavoidable one, of the motor vehicle, for example with an object in the surroundings and different to the motor vehicle, is detected. This means that the occupant protection device is activatable or can be activated before the actual point in time of the collision, whereby the occupant protection device can be referred to, in particular, as preventive occupant protection means. Alternatively, the occupant protection device can be able to be triggered in the event of a detected collision, which means that the occupant protection device can be activated at the point in time of the collision.

As a result of the movement of the occupant protection device from the starting position to the protection position, the driver sitting on a seat system of the motor vehicle or a body part of the driver can be moved, in particular in relation to the seat system. This means that the driver is touched by the occupant protection device moving from the starting position into the protection position and/or by the occupant protection device already in the protection position and is thus acted on by a force, whereby the driver or the body part is shifted. In particular when the protection device is a side airbag, the driver can be moved, for example, by the triggered occupant protection device in the direction of a vehicle middle of the motor vehicle. The movement of the occupant protection device from the starting position into the protection position preferably takes place before the start of the collision, whereby the driver can be brought into a position or a body posture by moving the driver or the body part of the driver, which is particularly favourable or safe for the imminent collision, whereby an injury of the driver, for example, in the collision can be kept particularly minimal or can be avoided. Thus, the airbag can already be unfolded before an actual accident of the car and here, in particular, can be unfolded in such a way that the driver can be moved away from an expected crash point of the vehicle. Thus, a degree of safety, referred to in particular as driving safety, of the car can be particularly increase. In particular when the occupant protection device is formed as a side airbag, the preventative deflection of the driver can be particularly high, whereby the safety can be particularly increased.

In order to particularly increase the degree of safety, in particular the degree of driving safety, it is provided according to the invention that the motor vehicle has at least one coupling device for coupling the at least one vehicle wheel to the occupant protection device, by means of which coupling device a pivoting angle of the vehicle wheel caused by a steering intervention of the driver, in particular an unwanted one, can be influenced, in particular reduced when the occupant protection device is triggered. In other words, the pivoting angle of the vehicle wheel caused by the steering intervention of the driver, in particular an unwanted one, can be influenced, in particular reduced, by means of the coupling device when the occupant protection device is triggered or is moved from the starting position into the protection position. This means that the vehicle wheel can be pivoted or is pivoted around the pivoting axis by a first pivoting angle as a result of the steering intervention, when the occupant protection device is in the starting position, and the vehicle wheel can be pivoted or is pivoted around a second pivoting angle different to the first pivoting angle, in particular smaller than the first pivoting angle, by means of the steering intervention, in particular an unwanted one. For example, the first pivoting angle can be caused by the torque caused by the driver and supplying the steering device, in particular by a torque value of the torque, when the occupant protection device is in the starting position, and the second pivoting angle can be caused by the torque caused by the driver and supplying the steering device, in particular by the torque value of the torque, when the occupant protection device is triggered.

The invention is based, in particular, on the following findings and considerations: when the occupant protection device is triggered, an unintentional or unwanted steering intervention by the driver can occur, for example, by impinging, in particular directly, the driver by the occupant protection device and/or by scaring the driver as a result of triggering the occupant protection device. This means that the driver can accidentally carry out an unwanted steering movement. In particular with an airbag formed as a side airbag, an arm of the driver can be in an unfolding chamber of the side airbag which, in particular in particularly unfavourable cases, can, for example, lead to an interaction, in particular a brief one, between the side airbag and the arm. Thus, the unwanted steering movement, for example, can be caused. In principle, it would be conceivable that, with a steering movement carried out in an uncontrolled or unwanted manner, at least one driving lane correcting intervention is carried out. This means that the unwanted steering movement can be automatically corrected again, for example, in order to at least keep in lane. Here, however, it is only possible to react to the uncontrolled steering movement, which means that the uncontrolled steering movement can only be counteracted when this has already taken place.

In contrast to this, with the motor vehicle according to the invention, the unwanted steering movement and thus the cornering and/or the direction change of the motor vehicle can be avoided or prevented by a preventative measure, in the form of influencing the pivoting angle. Thus, the degree of safety, in particular the degree of driving safety, of the motor vehicle can be particularly increased. The invention is particularly advantageous in particular when the triggering of the occupant protection device is false triggering, which means that despite recognising an imminent collision, for example, no collision is actually imminent for the vehicle in reality or the collision does not take place. By influencing the pivoting angle, caused by means of the coupling device, the unwanted steering movement of the motor vehicle can be preventatively avoided or kept particularly low in the event of the false triggering of the occupant protection device. Thus, in particular in the case of false triggering, the steering or the pivoting angle can be proactively influenced, instead of waiting for a reaction of the driver. Thus, the false triggering can be compensated for, whereby possible consequences of the false triggering can be avoided or can be kept particularly low. Thus, the degree of safety, in particular the degree of driving safety, of the motor vehicle can be particularly increased. Furthermore, a potential of preventative, in particular lateral, shifting of the driver can thus be particularly or fully exploited to increase the degree of driving safety.

For example, influencing the pivoting angle can provide that, in the event of the steering intervention caused by the driver, in particular an unwanted one, the vehicle wheel stops pivoting when the occupant protection device is triggered. This means that the steering, for example, can be blocked when the occupant protection device is triggered.

It is preferably provided that the pivoting angle can be influenced by means of the coupling device when the occupant protection device is triggered, when a set, in particular pre-defined, criterion is fulfilled, wherein influencing the pivoting angle stops when the occupant protection means are triggered, when the set criterion is not fulfilled. This means that influencing the pivoting angle, in particular reducing the pivoting angle, can be carried out or is carried out in the event of a steering intervention, in particular an unwanted one, when the occupant protection device is triggered and the criterion is fulfilled, wherein influencing the pivoting angle, in particular reducing the pivoting angle, cannot be carried out or is not carried out, when the criterion is not fulfilled despite the triggered occupant protection device. Thus, influencing, in particular reducing, the pivoting angle can be carried out as needed and thus, for example, only carried out when it is required or leads to particularly high use. Thus, the degree of safety, in particular the degree of driving safety, can be particularly increased.

The criterion is preferably a different criterion to the occupant protection device or a different criterion to the respective position of the occupant protection device. For example, the criterion is fulfilled when a period of time between a current point in time and a trigger point in time of the occupant protection device is smaller than a set, in particular pre-defined, time threshold value. Thus, the pivoting angle caused by the steering intervention of the driver can only be influenced, for example, within a time window in which typically a driver reaction, in particular an unwanted one, or steering movement is to be expected as a result of the triggering of the occupant protection device. Thus, the degree of safety of the motor vehicle can be particularly increased. The trigger point in time can be understood, in particular, to mean a point in time at which triggering the occupant protection device takes place or begins. This means that moving the occupant protection device from the starting position to the protection position begins, for example, at the trigger point in time.

In a further design, it is provided that the pivoting angle can be influenced or is influenced when the occupant protection deice is triggered, and in particular when the criterion is fulfilled, due to the fact that the torque to be applied or applied to the steering device to cause the steering intervention by the driver of the motor vehicle can be influenced, in particular increased, by means of the coupling device. This means that a severity of the steering can be influenced, in particular increased, by means of the coupling device. In other words, the steering device can be rotated by a first angle of rotation around the axis of rotation by applying the torque, in particular the torque value of the torque, to the steering device when the occupant protection device is in the starting position or the criterion is not fulfilled, and the steering device can be rotated by a second angle of rotation different to the first angle of rotation around the axis of rotation as a result of the torque, in particular the torque value, when the occupant protection device is triggered and, in particular, the criterion is fulfilled. By rotating the steering device by the first angle of rotation, the first pivoting angle can be caused, and by rotating the steering device by the second angle of rotation, the second pivoting angle can be caused. Preferably, the second angle of rotation is smaller than the first angle of rotation.

In a further embodiment, it is provided that the motor vehicle, in particular the coupling device, has an in particular mechanical and/or hydraulic and/or electric steering support device, by means of which, in the event of the respective steering intervention, a respective support torque can be caused to pivot the vehicle wheel around the pivoting axis, wherein the support torque can be influenced, in particular reduced, by means of the coupling device to influence the pivoting angle, in particular to reduce the pivoting angle, when the occupant protection device is triggered and, in particular, when the criterion is fulfilled. In other words, the pivoting angle of the vehicle wheel caused by the in particular unwanted steering intervention of the driver can be influenced by means of the steering support device when the occupant protection device is triggered. In other words again, the support torque applied with the steering intervention is smaller when the occupant protection device is triggered and, in particular, the criterion is fulfilled, than when the support device is in the starting position or the criterion is not fulfilled. Thus, an effort for influencing the pivoting angle, for example, can be kept particularly low. Furthermore, costs and construction space of the motor vehicle, for example, can be kept particularly low.

The steering support device is preferably formed as power steering. Pivoting the vehicle wheel can be caused by means of the torque applied to the steering device by the driver and by means of the support torque, wherein the support torque can preferably be set or is set depending on the steering intervention or depending on the torque applied to the steering device by the driver.

In a further embodiment, at least one detection device is provided by means of which at least one position of the driver in the motor vehicle can be detected. Alternatively or additionally, a touch position of a touch region of the steering device can be detected by means of the at least one detection device, wherein, during the steering intervention, a hand of the driver touches, in particular directly, the steering device on the touch region, or the steering device engages around the touch region. In other words, the position of the driver and/or the touch position of the touch region can be monitored or detected by means of the at least one detection device. The touch position can thus be understood to mean, in particular, a hand position on the steering device, in particular on the steering wheel rim of the steering device.

It is preferably provided that the criterion is fulfilled when the detected position corresponds to a set critical position of the driver and/or the detected touch position corresponds to a set critical touch position of the touch region. In other words, the criterion is fulfilled when a variable characterising the position and/or the touch position has a first value, wherein the criterion is not fulfilled when the variable characterising the position and/or the touch position has a second value different to the first value. Thus, during the in particular unwanted steering intervention, the pivoting angle can be adjusted or set particularly advantageously as needed.

For example, a variable characterising a probability is ascertained depending on the position and/or the touch position, wherein the criterion is fulfilled, for example, when the variable characterising the probability exceeds or does not meet a set threshold value. The probability is preferably a probability as to whether the unwanted steering intervention is to be expected as a result of triggering the occupant protection device.

Furthermore, depending on the detected position and/or the touch position, the window of time, for example, can be influenced, in particular with respect to its start and/or with respect to its length.

In a further design, it is provided that the pivoting angle when the occupant protection device is triggered, and in particular when the criterion is fulfilled, can be influenced depending on the detected position and/or the detected touch position. In other words, it can be provided that, when the occupant protection device is triggered in a first position of the driver detected by means of the detection device, the second pivoting angle can be caused by the in particular unwanted steering intervention of the driver and, upon detecting a second position of the driver different to the first position, a third pivoting angle of the vehicle wheel different to the second pivoting angle can be caused by the in particular unwanted steering intervention of the driver. Alternatively or additionally, it can be provided that, when the occupant protection device is triggered, upon detecting a first touch position of the touch region, the second pivoting angle can be caused by the in particular unwanted steering intervention of the driver and, upon detecting a second touch position of the touch region different to the first touch position, the third pivoting angle of the vehicle wheel can be caused by the in particular unwanted steering intervention of the driver. This means that the position of the driver and/or the touch position can be taken into consideration in order to influence the pivoting angle in the in particular unwanted steering intervention, in particular in instances in which a hand movement of the driver is expected as a result of triggering the occupant protection device, which can lead to the unwanted steering movement. Thus, influencing the pivoting angle can be carried out as needed. Here, a degree of the steering severity, for example, can be specifically set as needed. Thus, influencing the pivoting angle can be carried out particularly effectively depending on the situation, whereby the degree of safety of the motor vehicle can be particularly increased.

It is preferably provided that an upper body position of an upper body of the driver, in particular a distance between the upper body and the occupant protection device, and/or an arm position of an arm of the driver, in particular a distance between the arm and the occupant protection device, can be detected as the position by means of the at least one detection device. In other words, the upper body position of the upper body of the driver in the motor vehicle can be recorded or detected by means of the at least one detection device. Alternatively or additionally, the arm position of the driver in the motor vehicle can be recorded or detected by means of the at least one detection device. For example, a stronger or particularly strong driver reaction when the occupant protection device is triggered, i.e., a stronger or particularly strong unwanted steering impact, is to be expected when the upper body and/or the arm is closer or particularly close to the occupant protection device, whereby in these cases influencing the pivoting angle can be influenced or particularly reduced, in particular the steering severity can be particularly increased. Thus, influencing the pivoting angle, in particular the steering severity, can be set as needed, whereby the degree of safety of the motor vehicle can be particularly increased.

In a further embodiment it is provided that the steering device can be rotated around the axis of rotation of the steering device to cause the steering intervention, wherein when the occupant protection device is triggered, and in particular when the criterion is fulfilled, the pivoting angle can be influenced, in particular can be reduced, depending on a direction of rotation, present in the steering intervention, of the rotation of the steering device. In other words, the steering device can be rotated around the axis of rotation, in particular by the driver and in particular manually, in two directions of rotation running opposite to each other, wherein when the occupant protection device is triggered, the second pivoting angle can be caused by the steering intervention caused by the driver when the steering device is or becomes rotated around a first of the directions of rotation in the steering intervention, and the third pivoting angle can be caused when the steering device is or becomes rotated around the second of the directions of rotation in the steering impact. Thus, the degree of safety of the motor vehicle can be particularly increased.

In a method for operating a motor vehicle having at least one vehicle wheel and one occupant protection device, in which motor vehicle the occupant protection device is triggered in the event of an imminent collision or in the event of a detected collision and is thus moved from a starting position into a protection position, a driver sitting on a seat system of the motor vehicle or a body part of the driver is moved. It is provided that the vehicle wheel can be or is pivoted by a pivoting angle around a pivoting axis by means of a steering device of the motor vehicle with a steering intervention caused by a driver, whereby cornering and/or direction changes can be or are caused.

In order to particularly increase a degree of safety of the motor vehicle, it is provided according to the invention that, when the occupant protection device is triggered, a pivoting angle of the vehicle wheel caused by a steering intervention of the driver is influenced, in particular reduced, in particular by means of a coupling device for coupling the vehicle to the occupant protection device. Advantages and advantageous designs of the first aspect of the invention are to be seen as advantages and advantageous designs of the second aspect of the invention and vice versa.

Further advantages, features and details of the invention emerge from the description below of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own without leaving the scope of the invention.

DETAILED DESCRIPTION OF THE DRAWINGS

The same or functionally identical elements are provided with the same reference number in the figures.

Figure 1:
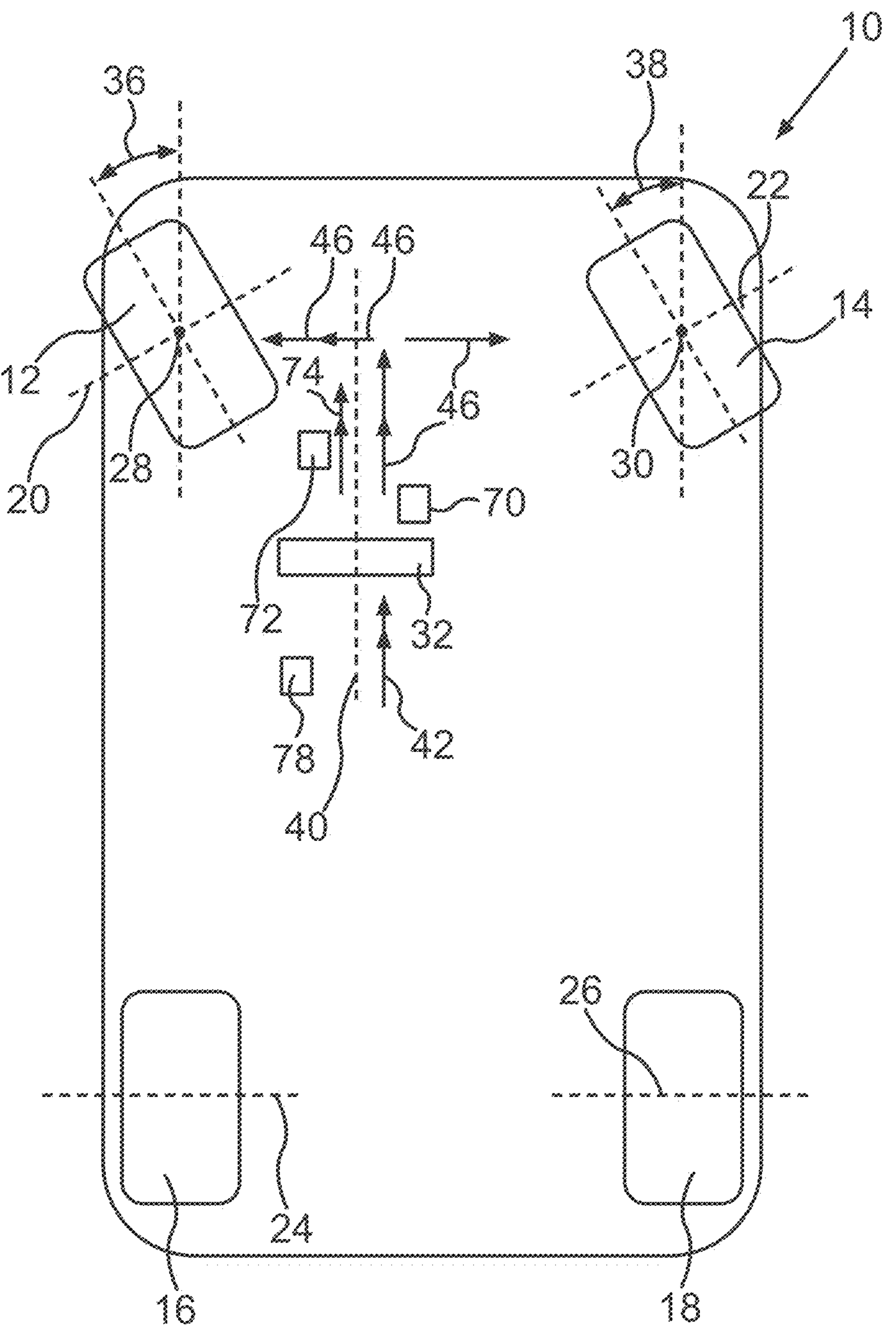
FIG. 1 is a schematic partial sectional view of a motor vehicle according to the invention, which can be operated by means of a method according to the invention.
Figure 2:
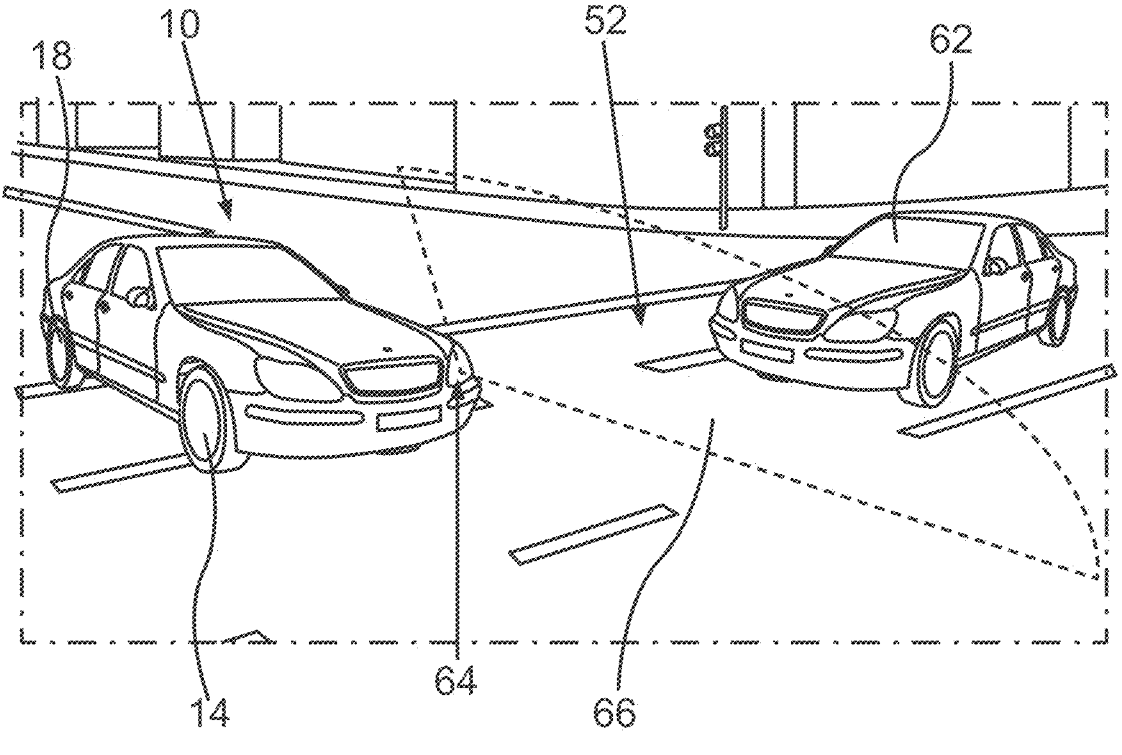
FIG. 2 is a schematic perspective view of a motor vehicle according to the invention, which can be operated by means of a method according to the invention.

In a schematic partial sectional view, FIG. 1 shows a motor vehicle 10, which is preferably formed as a passenger car. FIG. 2 shows the motor vehicle 10 in a schematic perspective view. The motor vehicle 10 has several vehicle wheels 12, 14, 16, 18, wherein the motor vehicle 10 has four vehicle wheels 12, 14, 16, 18 in the exemplary embodiment. The respective vehicle wheel 12, 14, 16, 18 can be rotated around a respective wheel axis of rotation 20, 22, 24, 26 in relation to a structure of the motor vehicle 10. Thus, a first of the vehicle wheels 12 can be rotated around a first of the wheel axes of rotation 20, a second of the vehicle wheels 14 around a second of the wheel axes of rotation 22, a third of the vehicle wheels 16 around a third of the wheel axes of rotation 24 and the fourth of the vehicle wheels 18 around the fourth of the wheel axes of rotation 26.

At least one of the vehicle wheels 12, 14, 16, 18 can be pivoted around a pivoting axis 28, 30 in relation to the structure of the motor vehicle 10. In the exemplary embodiment shown in FIG. 1, the first and the second vehicle wheel 12, 14 can be pivoted around a respective pivoting axis 28, 30 in relation to the structure of the motor vehicle 10. Thus, the first vehicle wheel 12 can be pivoted around of first of the pivoting axes 28 and the second vehicle wheel 14 around the second of the pivoting axes 30. The respective pivoting axis 36, 38 preferably runs at least roughly in the vertical direction of the vehicle. Alternatively, the respective pivoting axis 36, 38 can be twisted or rotated, for example, by an angle in relation to the vertical axis of the vehicle, in particular around a transverse axis of the vehicle.

The motor vehicle 10 has a steering device 32, by means of which the respective vehicle wheel 12, 14 can be pivoted with a or by means of a steering intervention caused by a driver 34 of the motor vehicle 10 by a respective pivoting angle 36, 38 around the respective pivoting axis 28, 30, whereby cornering and/or direction changes of the motor vehicle 10 can be caused, in particular manually. Here, the first vehicle wheel 12 can be pivoted by a first pivoting angle 36 and the second vehicle wheel 14 by a second pivoting angle 38, wherein the pivoting angles 36, 38 are preferably the same, in particular according to the amount.

Figure 3:
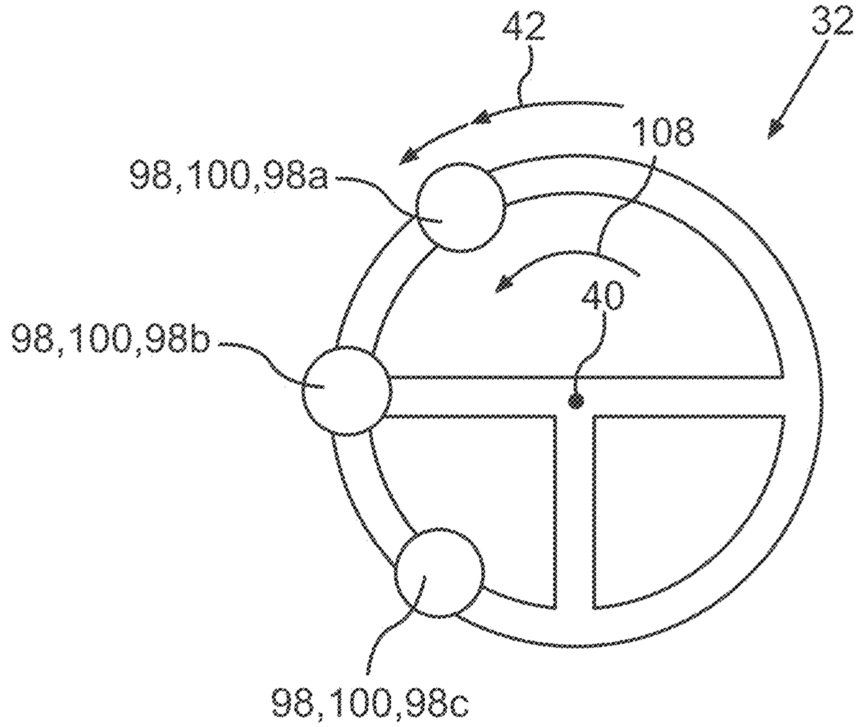
FIG. 3 is a schematic front view of a steering device of a motor vehicle according to the invention.

In a schematic top view, FIG. 3 shows the steering device 32 of the motor vehicle 10. The steering device 32 is preferably formed as a steering wheel. The steering device 32 can be rotated, in particular manually, around an axis of rotation 40 referred to, in particular, as a steering wheel axis of rotation, to cause the steering intervention. This means that a torque 42 is to be applied to the steering device 32 to cause the steering intervention by the driver 34 of the motor vehicle 10, by means of which torque the rotation of the steering device 32 around the axis of rotation 40 can be caused. Here, the steering device 32 and the respective vehicle wheel 12, 14 are coupled, in particular mechanically and/or electrically, in such a way that the pivoting of the respective vehicle wheel 12, 14 can be caused from the rotation of the steering device 32. This means that the torque 42 applied by the driver 34 for pivoting the respective vehicle wheel 12, 14 can be applied or is applied to the respective vehicle wheel 12, 14. Such a torque flow for transferring the torque 42 to the respective vehicle wheel 12, 14 is schematically sketched in FIG. 1 by means of arrows 46.

Figure 4:
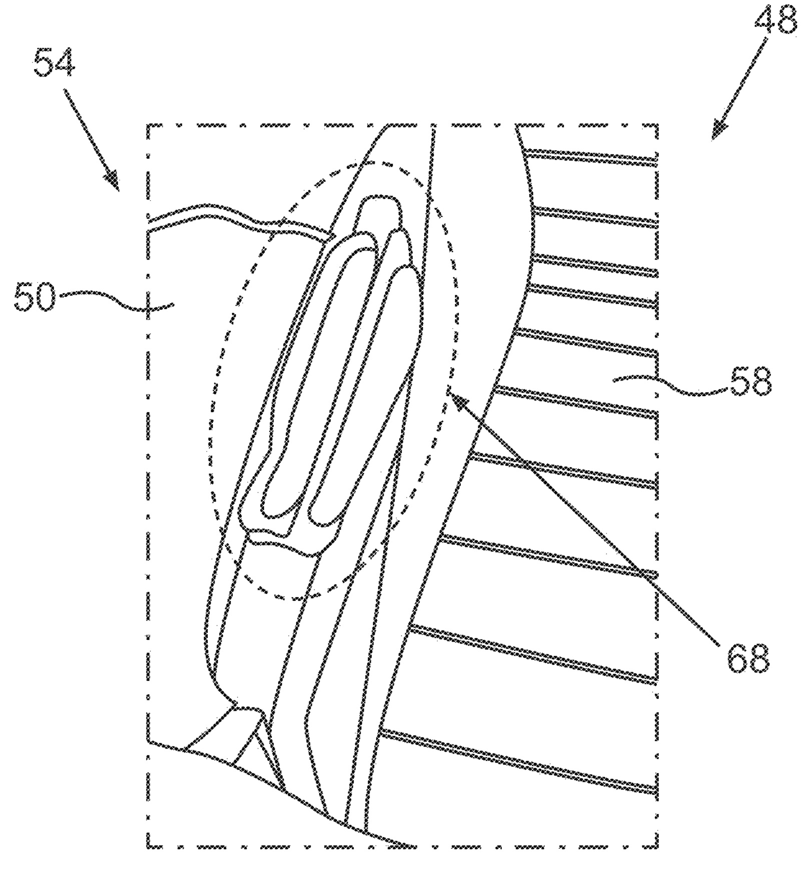
FIG. 4 is a schematic partial view of an interior chamber of a motor vehicle according to the invention.
Figure 5:
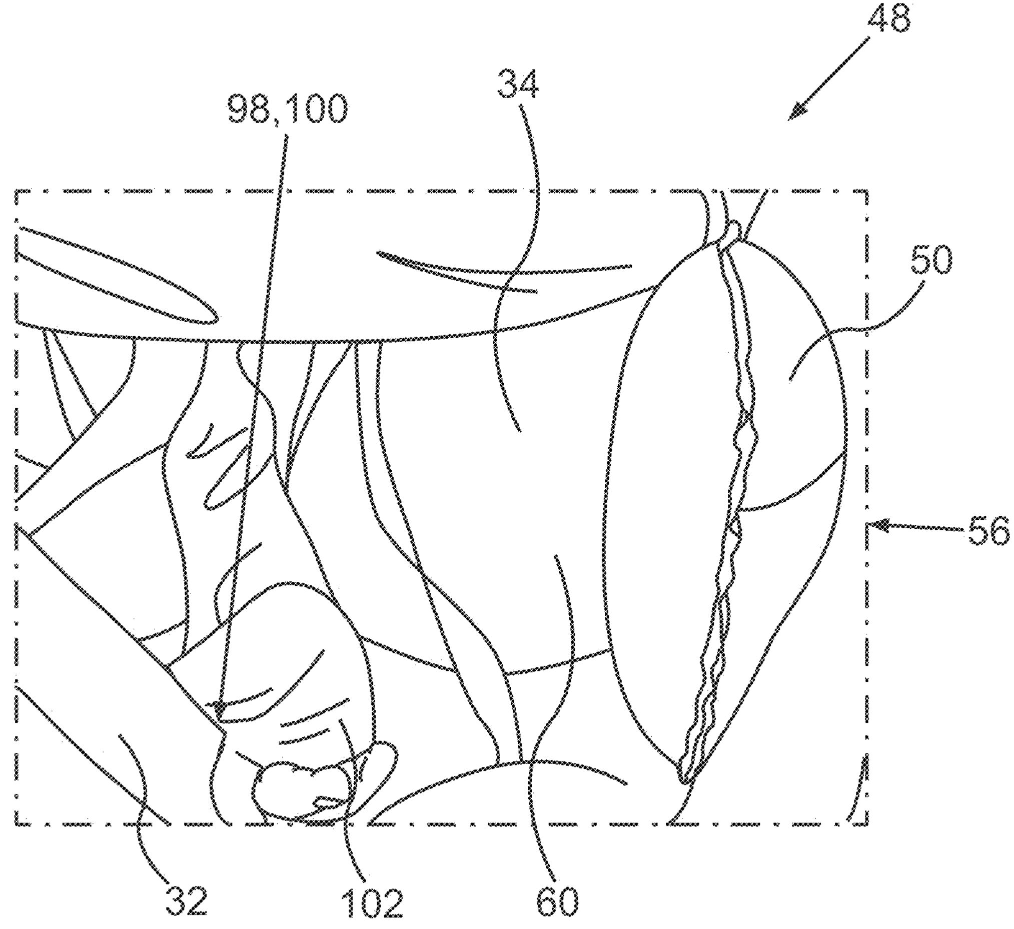
FIG. 5 is a schematic partial view of an interior chamber of a motor vehicle according to the invention with triggered occupant protection device.

The motor vehicle 10 has an interior chamber 48, referred to in particular as a vehicle interior chamber, in which the driver 34 is located when driving the motor vehicle 10. The steering device 32 is arranged in the interior chamber 48. FIG. 4 and FIG. 5 show the interior chamber 48 of the motor vehicle 10 in a respective schematic partial view.

Figure 6:
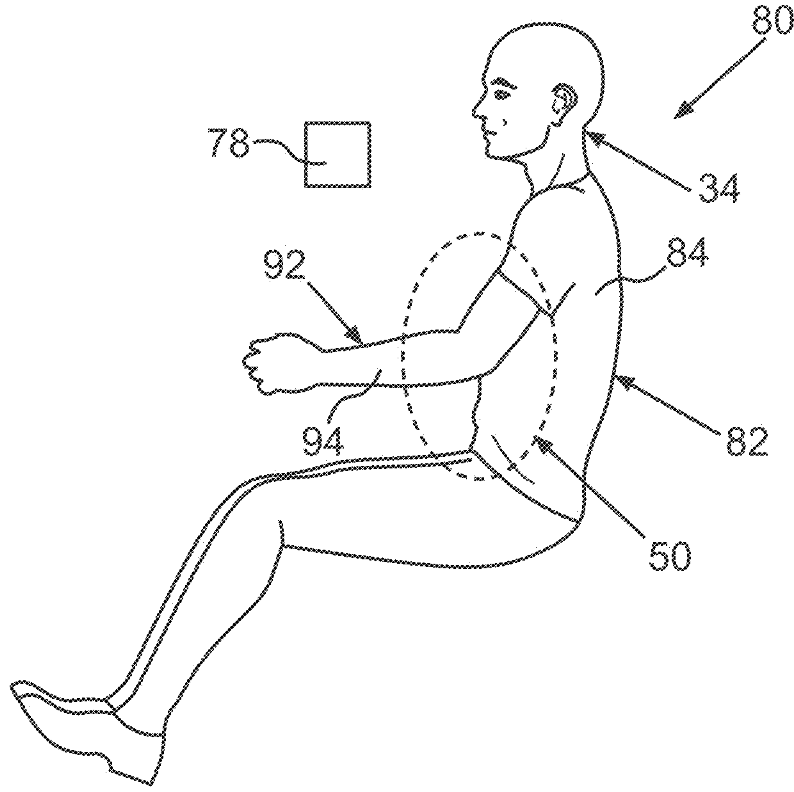
FIG. 6 is a schematic side view of a driver and an occupant protection device of a motor vehicle according to the invention.

The motor vehicle 10 has at least one occupant protection device 50, which can be triggered in the event of an imminent collision 52 or in the event of a detected collision and can thus be moved from a starting position 54 into a protection position 56, whereby the driver 34 sitting on a seat system 58 of the motor vehicle 10 or a body part 60 of the driver 34 can be moved. In FIG. 4, the occupant protection device 50 is in the starting position 54 and, in FIG. 5, the occupant protection device 50 is in the protection position 56. The occupant protection device 50 is preferably an air bag, referred to, in particular, as an airbag. The air bag is preferably formed as a side airbag. This means that the occupant protection device 50 in the starting position 54 can be spaced apart from the driver on the seat system 58 in the transverse direction of the vehicle, wherein the occupant protection device 50 is here preferably arranged further outwardly in the transverse direction of the vehicle than the seat system 58 or the driver sitting on the seat system 58. By moving the occupant protection device 50 from the starting position 54 into the protection position 56, an impulse, in particular referred to as a push, is applied to the driver 34, for example, by the occupant protection device 50, whereby the driver 34 is moved and is thus moved or shifted in the direction of the middle of the vehicle, for example. The seat system 58 is arranged in the interior chamber 48. In a schematic side view, FIG. 6 shows the driver 34 and the occupant protection device 50.

The imminent collision 52 is schematically sketched in FIG. 2, wherein the imminent collision 52 is an imminent collision of the motor vehicle 10 with a further motor vehicle 62 different to the motor vehicle 10. Preferably, the motor vehicle 10 comprises at least one collision detection device 64, by means of which the imminent collision 52 or the collision can be detected. The collision detection device 64 preferably comprises at least one sensor element, by means of which a surroundings of the motor vehicle 10 can be detected or observed. For example, the sensor element is formed as a radar sensor and/or as a camera sensor ad/or as a lidar sensor. For example, the imminent collision 52 can be detected by means of the collision detection device 64 when the further motor vehicle 62 is in a detection region 66 of the collision detection device 64, in particular of the sensor element. Preferably, the collision detection device 64 comprises at least one electronic computing device, by means of which the imminent collision 52 can be ascertained or detected, in particular by means of situation analysis, depending on data detected by means of the sensor element.

Preferably, the occupant protection device 50 can be triggered by means of the collision detection device 64, in particular by means of the electronic computing device. This means that at least one actuator 68 is provided, for example, which can be controlled by means of the collision detection device 64, in particular by means of the electronic computing device, whereby moving the occupant protection device 50 from the starting position 54 into the protection device 56 can be caused.

In order to particularly increase a degree of safety of the motor vehicle 10, referred to in particular as driving safety, at least one in particular mechanical and/or electric and/or hydraulic coupling device 70 is provided for coupling the respective vehicle wheel 12, 14 to the occupant protection device 50, by means of which, when the occupant protection device 50 is triggered, a respective pivoting angle 36, 38, caused by an in particular unwanted steering intervention of the driver 34, of the respective vehicle wheel 12, 14 can be influenced, in particular reduced. By triggering or by moving the occupant protection device 50, it is possible to cause the unwanted steering intervention of the driver 34 from which an unwanted steering movement of the motor vehicle 10, i.e., unwanted cornering or an unwanted change of direction of the motor vehicle 10, can be caused. By influencing the pivoting angle 36, 38, the unwanted cornering or the unwanted change of direction can be avoided or can be kept particularly low. Thus, in particular when the detected collision 52 is a false detection and thus triggering the occupant protection device 50 is a false triggering, the degree of safety of the vehicle 10 can be particularly increased.

For example, it is provided that the respective pivoting angle 36, 38 when the occupant protection device 50 is triggered can be influenced in that the torque 42 to be applied to the steering device 32 by the driver 34 of the motor vehicle 10 to the steering device 32 for causing the steering intervention can be influenced by means of the coupling device 70. This means that the steering of the motor vehicle 10 when the occupant protection device 50 is triggered can be hardened, in particular can be blocked, when the occupant protection device 50 is triggered. Thus, the unwanted steering movement can be particularly advantageously avoided.

It can be provided that pivoting the respective vehicle wheel 12, 14 ceases with the in particular unwanted steering intervention when the occupant protection device 50 is triggered. This can be referred to, in particular, as blocking the steering.

The occupant protection device 50 is preferably a respective occupant device allocated to the driver 34 of the motor vehicle 10. This means that influencing the respective pivoting angle 36, 38 is carried out by means of the coupling device 70 or hardening the steering is carried out when the occupant protection device 50 allocated to the driver 34 of the motor vehicle 10 is triggered and in particular not when only a further occupant protection device formed separately to the occupant protection device 50 and allocated to a passenger of the driver 34 is triggered or triggers.

It is preferably provided that the motor vehicle has an in particular mechanical and/or hydraulic and/or electric steering support device 72, by means of which, in the event of the steering intervention, a support torque 74 can be caused to pivot the respective vehicle wheel 12, 14 around the respective pivoting axis 28, 30. Here, the steering support device is, for example, power steering, which can be referred to, in particular, as servo-support. Preferably, it is provided that the support torque 74 for influencing the respective pivoting angle 36, 38 when the occupant protection device 50 is triggered can be influenced, in particular reduced. Thus, the steering can be hardened by means of the steering support device when the occupant protection device 50 is triggered. Thus, the respective pivoting angle 36, 38 can be influenced with particularly low effort and in a particularly effective manner. Alternatively or additionally, hardening the steering can be carried out, for example by means of a means formed separately to the steering support device 72.

Figure 7:
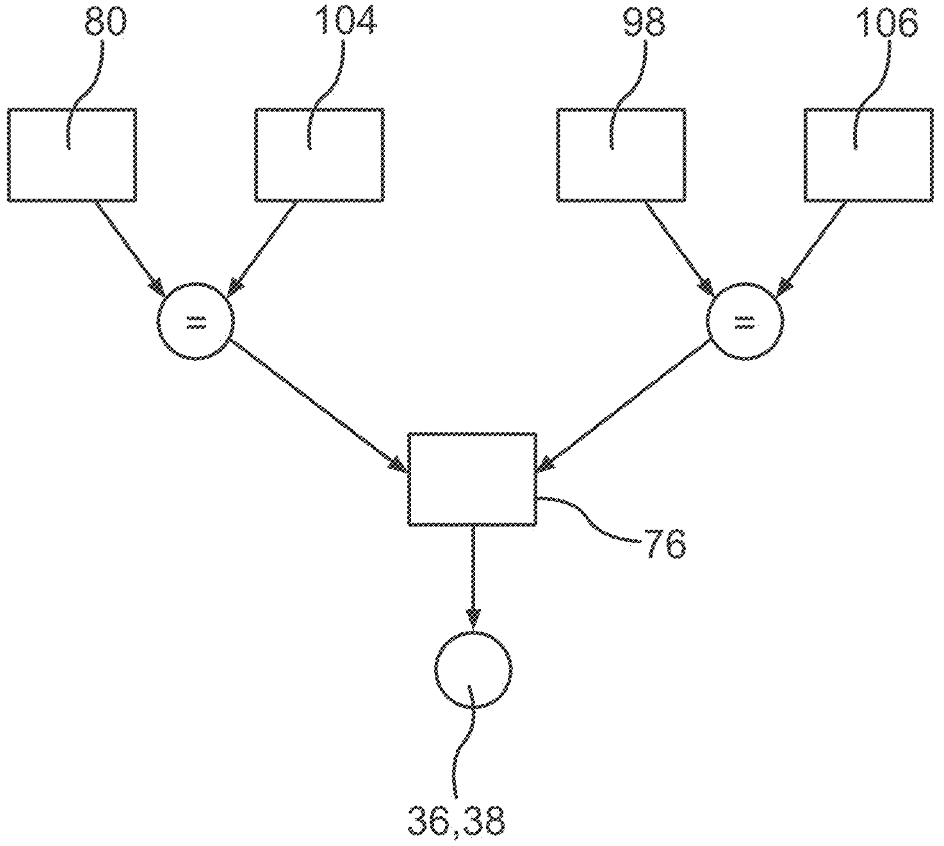
FIG. 7 is a schematic flowchart for illustrating a criterion for influencing a pivoting angle of a vehicle wheel of a motor vehicle according to the invention.

In a further design, it is provided that the respective pivoting angle 36, 38 can be influenced by means of the coupling device 70 when the occupant protection device 50 is triggered when a set, in particular pre-defined, criterion 76 is fulfilled. The criterion 76 is illustrated in FIG. 7 in a schematic flowchart.

Preferably, influencing the respective pivoting angle 36, 38 ceases when the occupant protection device 50 is triggered when the set criterion 76 is not fulfilled. In instances or scenarios in which the unwanted steering intervention n of the driver 34 appears possible, the respective pivoting angle 36, 38 can be influenced by the criterion 76 by means of the coupling device 70, in particular the steering can be hardened. This means that the steering is only hardened, for example, when an influence or exertion of influence on the steering or the steering movement of the motor vehicle by the occupant protection device 50 to be triggered is to be expected.

Figure 8:
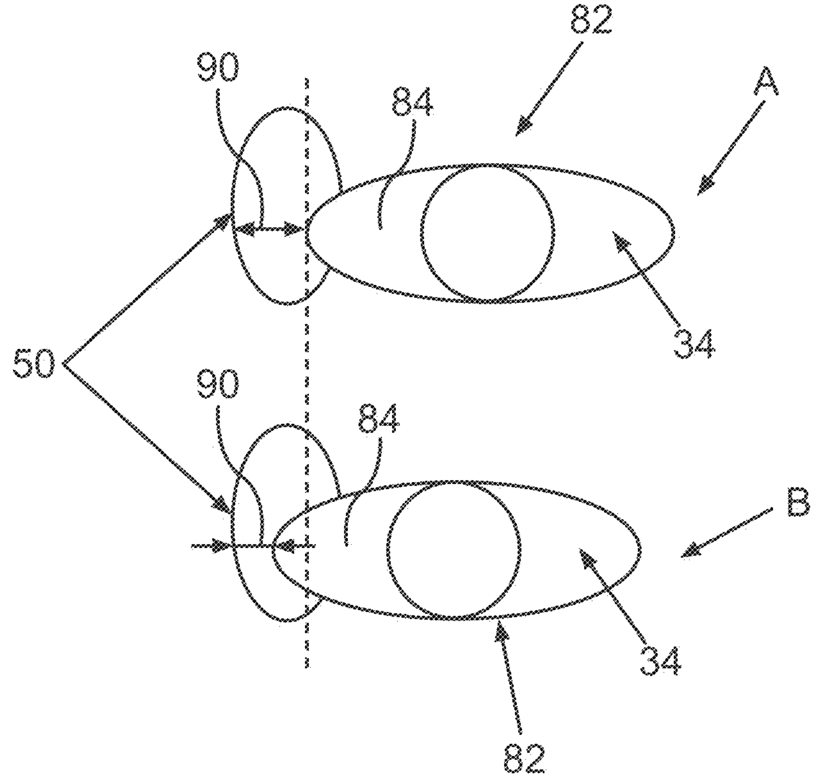
FIG. 8 is schematic top views of a driver and an occupant protection device of a motor vehicle according to the invention for illustrating a respective upper body position of the driver.

In a further design, at least one detection device 78 is provided by means of which at least one position 80 of the driver 34 in the motor vehicle 10 can be detected. Preferably, an upper body position 82 of an upper body 84 of the driver 34 can be detected as the position 80 by means of the at least one detection device 78. Here, particularly preferably, a spacing 90 between the upper body 84 and the occupant protection device 50 can be detected as the position 80 or the upper body position 82. This is illustrated in FIG. 8 in which, in two schematic top views A, B, the driver 34 and the occupant protection device 50 are shown. In a first of the top views A, the upper body 84 is here in a reference position. In the second of the top views B, the upper body 84 is in a further position different to the reference position, in which the upper body 84 is arranged closer to the occupant protection device 50 than in the reference position. Thus, in the further position when triggering the occupant protection device 50, the push acting on the upper body 84 by the occupant protection device 50 and thus the movement of the driver 34 is greater than in the reference position.

Figure 9:
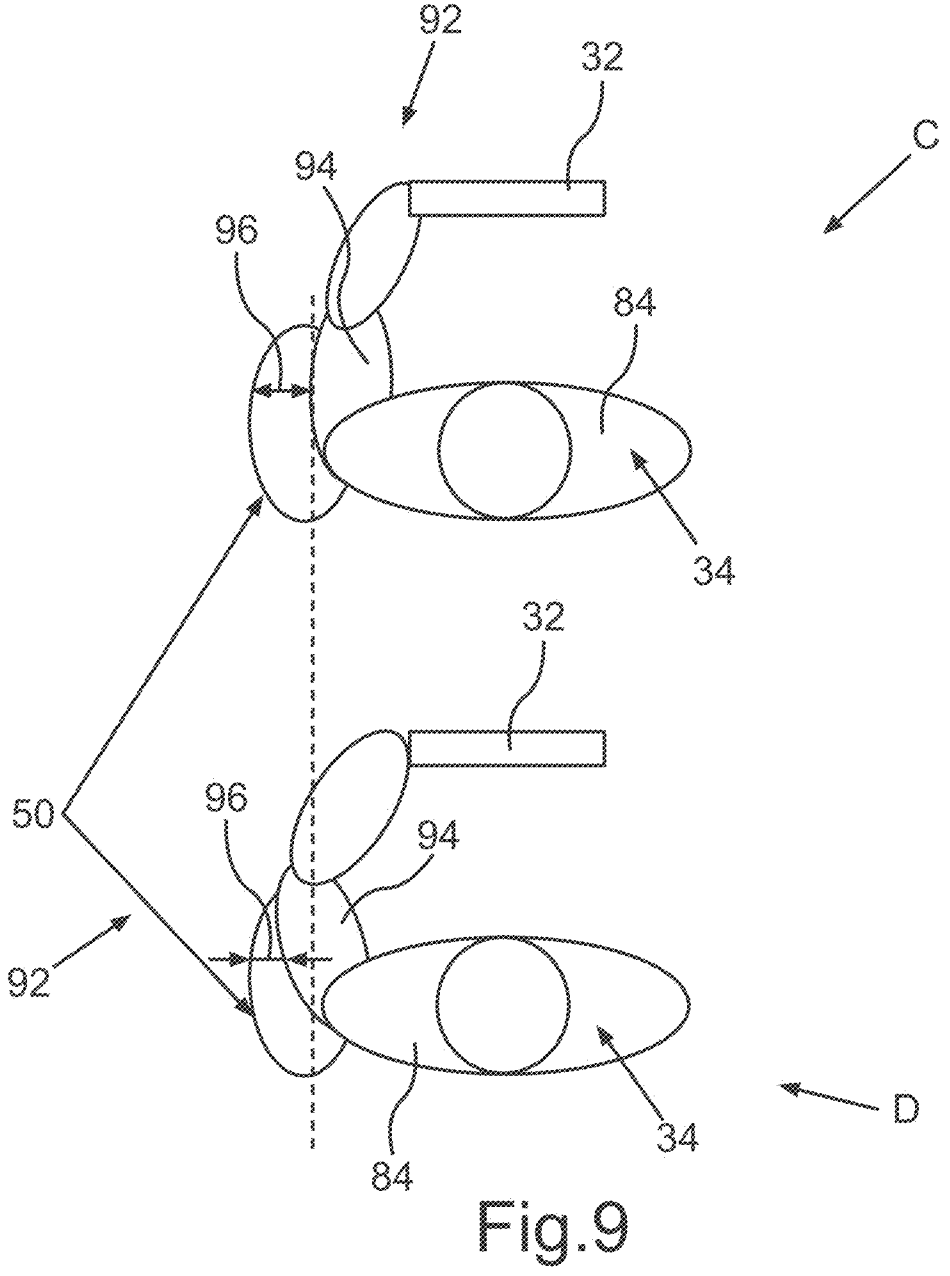
FIG. 9 is schematic top views of a driver, a steering device and an occupant protection device of a motor vehicle according to the invention for illustrating a respective arm position of the driver.

Alternatively or additionally, it is provided that an arm position 92 of an arm 94 of the driver 34 can be detected by means of the detection device 78. Particularly preferably, it is here provided that a spacing 96 between the arm 94 and the occupant protection device 50 can be detected as the position 80 by means of the detection device 78. This is illustrated in FIG. 9 in which in two schematic top views C, D in each case the driver 34 and the occupant protection device 50 are shown. In a first of the top views C, the arm 94 of the driver 34 is in a reference position and, in a second of the top views D, the arm 94 of the driver 34 is in a further position different to the reference position, in which the arm 94 is arranged closer to the occupant protection device 50 than in the reference position. Thus, in the further position, a higher or greater in particular unwanted steering movement is to be expected than in the reference position.

Alternatively or additionally, at least one touch position 98 of a touch region 100 of the steering device 32 can be detected by means of the detection device 78, wherein, in the steering intervention, a hand 102 of the driver 34 touches the steering device 32 in the touch region 100, in particular directly, or engages around the touch region 100. This is illustrated in FIG. 3 and in FIG. 5. In FIG. 3, three respective touch positions 98*a-c* are shown by way of example. In a first of the touch positions 98*a*, no unwanted steering intervention and thus no unwanted steering movement is to be expected. This is particularly the case because the arm 94 is arranged particularly high in the first touch position 98*a*. Thus, interaction between the triggered occupant protection device 50 and the arm 94 preferably does not place. In a second of the touch positions 98*b* and the third of the touch positions 98*c*, a respective unwanted steering movement can occur, wherein the unwanted steering movement in the second touch position 98*b* is smaller than in the third touch position 98*c*. This is particularly the case because, in the second touch position 98*b*, the arm 94 is bent and, in the third touch position, the arm 94, in particular an upper arm of the driver 34, rests on the upper body 84. Thus, in the third touch position 98*c*, a greater interaction between the occupant protection device 50 and the arm 94 is to be expected. The touch position 98 can be understood, in particular, to mean a hand position of the hand 102 of the driver 34 on the steering device 32.

In a further design, it is provided that the criterion 76 is fulfilled when the detected position 80, in particular the upper body position 82 and/or the arm position 92, corresponds to a respective set critical position 104. Alternatively or additionally, it is provided that the criterion 76 is fulfilled or becomes fulfilled when the detected touch position 98 corresponds to a set critical touch position 106. Thus, influencing the respective pivoting angle 36, 38, in particular hardening the steering, for example, can only be carried out when the unwanted steering movement is to be expected. Thus, the degree of safety of the motor vehicle 10 can be particularly increased.

The critical position 104 and/or the critical touch position 106 is preferably a respective position region. For example, the second and the third touch position 98*b, c* are a respective critical touch position 106. Preferably, it is provided that the criterion is not fulfilled when the detected position 80 does not correspond to the critical position 104, and/or the detected touch position 98 does not correspond to the critical touch position 106. For example, the first touch position 98*a* does not correspond to the critical touch position 106.

Preferably, it is provided that, when the occupant protection device 50 is triggered, and in particular when the criterion 76 is fulfilled, the respective pivoting angle 36, 38 can be influenced depending on the detected position 80, in particular on the upper body position 82 and/or the arm position 92, and/or depending on the detected touch position 98. This means that the steering can be hardened depending on the detected position 80 and/or the detected touch position 98. Thus, depending on the position of the upper body 84 and/or the arm 94 and/or the hand 102 on the steering device 32, for example, an in particular direct kinematic interaction between the arm 94 or the hand 102 can be ascertained or predicted and, depending on this, influencing or hardening the steering can be set, i.e., adjusted in terms of its strength. Thus, the strength of the steering hardening can be adjusted to the steering impact or the steering movement depending on the expected influence of the occupant protection device 50. This means a probability of the kinematic interaction and thus the unwanted steering movement, for example, can be ascertained and, depending on the probability ascertained, the steering, in particular the hardening of the steering, can be adjusted. Thus, the degree of safety of the motor vehicle 10 can be particularly increased.

For example, a strength or a magnitude of the unwanted steering movement can be ascertained or detected. For example, the torque 42 or a force of a hand movement of the driver 34 during the unwanted steering impact can be detected or ascertained. For example, depending on the magnitude detected and/or depending on the torque 42 detected, a strength of a required influence of the steering or the respective pivoting angle 36, 38, in particular the hardening, can be ascertained in order to prevent the unwanted steering movement or to at least keep it as minimal as possible.

In a further design, it is provided that, when the occupant protection device 50 is triggered, and in particular when the criterion 76 is fulfilled, the respective pivoting angle 36, 38 can be influenced depending on a torque 108, present in the steering intervention, of the rotation of the steering device 32. Thus, the steering can be hardened depending on the direction of rotation 108. Thus, the degree of safety of the motor vehicle 10 can be particularly increased.

LIST OF REFERENCE CHARACTERS

10 Motor vehicle
12 First vehicle wheel
14 Second vehicle wheel
16 Third vehicle wheel
18 Fourth vehicle wheel
20 First wheel axis of rotation
22 Second wheel axis of rotation
24 Third wheel axis of rotation
26 Fourth wheel axis of rotation
28 First pivoting axis
30 Second pivoting axis
32 Steering device
34 Driver
36 Frist pivoting angle
38 Second pivoting angle
40 Axis of rotation
42 Torque
46 Arrow
48 Interior chamber
50 Occupant protection device
52 Imminent collision
54 Starting position
56 Protection position
58 Seat system
60 Body part
62 Further vehicle
64 Collision detection device
66 Detection region
68 Actuator
70 Coupling device
72 Steering support device
74 Support torque
76 Criterion
78 Detection device
80 Position
82 Upper body position
84 Upper body
90 Spacing
92 Arm position
94 Arm
96 Spacing
98 Touch position
**98*a*** First touch position
**98*b*** Second touch position
**98*c*** Third touch position
100 Touch region
102 Hand
104 Critical position
106 Critical touch position
108 Direction of rotation
A First top view
B Second top view
C First top view
D Second top view

The invention claimed is:

1. A motor vehicle (10), comprising:

a vehicle wheel (12) which is pivotable around a pivoting axis (28) by a steering device (32) of the motor vehicle (10) such that cornering and/or changes of a direction of the motor vehicle (10) is causable;

an occupant protection device (50) which is triggerable in an event of an imminent collision (52) or in an event of a detected collision and thus is movable from a starting position (54) into a protection position (56) such that a driver (34) sitting on a seat system (58) of the motor vehicle (10), or a body part (60) of the driver (34), is movable; and a coupling device (70) that couples the vehicle wheel (12) to the occupant protection device (50), wherein via the coupling device (70), when the occupant protection device (50) is triggered, a pivoting angle (36) of the vehicle wheel (12) around the pivoting axis (28) caused by a steering intervention of the driver (34) is influenceable when a set criterion (76) is fulfilled and is not influenceable when the set criterion (76) is not fulfilled; and a detector (78) via which a touch position (98) of a touch region (100) of the steering device (32) is detectable, wherein, in the steering intervention, a hand (102) of the driver (34) touches the steering device (32) in the touch region (100) and wherein the set criterion (76) is fulfilled when a detected touch position (98) corresponds to a set critical touch position (106).

2. The motor vehicle (10) according to claim 1, wherein the pivoting angle (36) is influenceable by a torque (42) that is increased by the coupling device (70).

3. The motor vehicle (10) according to claim 1, further comprising a steering support device (74) via which, in the steering intervention, a support torque (76) pivots the vehicle wheel (12) around the pivoting axis (28), wherein the support torque (76) is influenceable to influence the pivoting angle (36).

4. The motor vehicle (10) according to claim 1, wherein the pivoting angle (36) is influenceable depending on the detected touch position (98).

5. The motor vehicle (10) according to claim 1, wherein the steering device (32) is rotatable around an axis of rotation (40) of the steering device (32) to cause the steering intervention and wherein, when the occupant protection device (50) is triggered, the pivoting angle (32) is influenceable depending on a direction of rotation (108), present in the steering intervention, of the steering device (32).

* * * * *